Oct. 20, 1931.    F. H. KREWSON    1,827,850
TOOL FOR REMOVING TIRES
Filed April 21, 1931    2 Sheets-Sheet 1
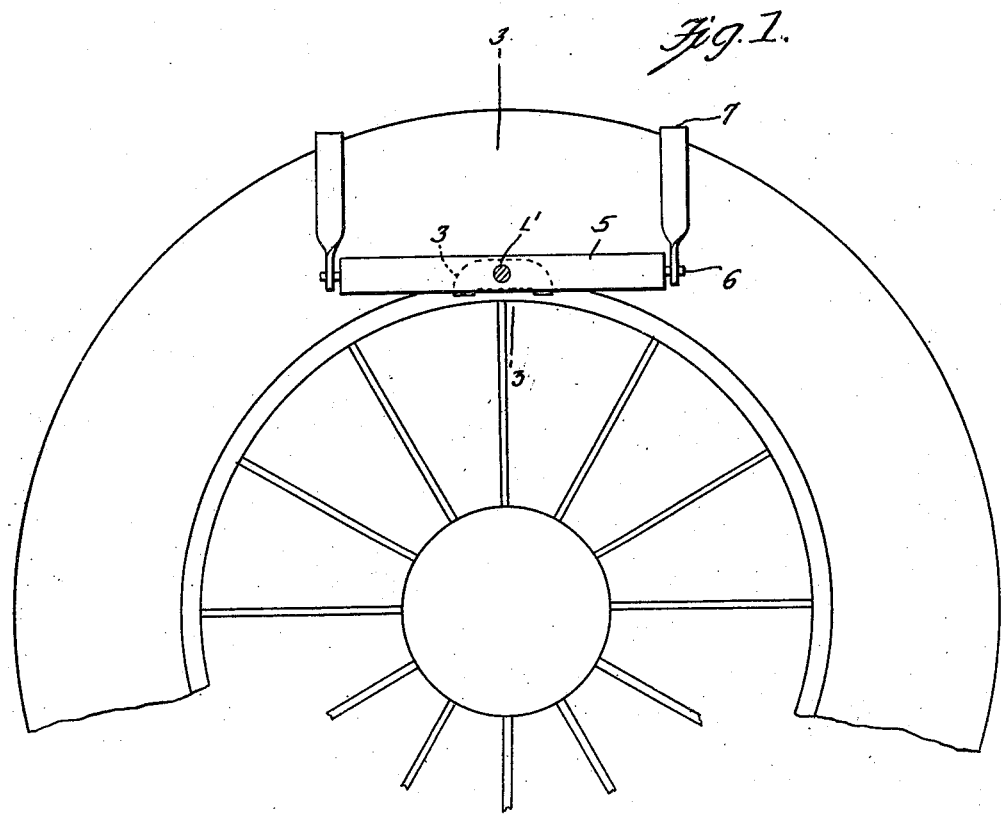
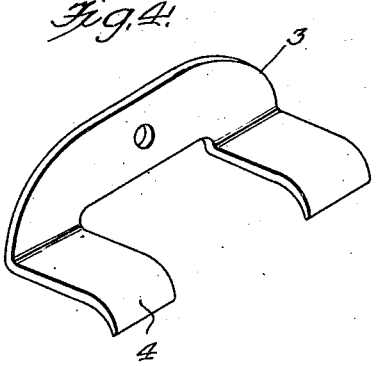
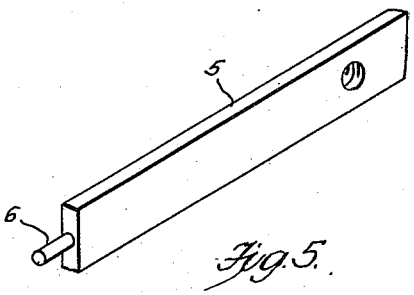
Inventor
Floyd H. Krewson,
By Clarence A. O'Brien
Attorney Oct. 20, 1931.  F. H. KREWSON  1,827,850
TOOL FOR REMOVING TIRES
Filed April 21, 1931  2 Sheets-Sheet 2
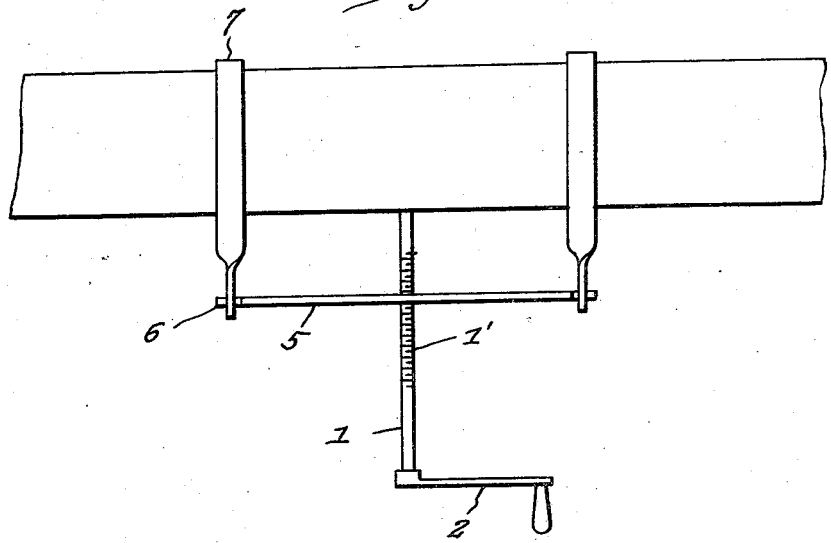
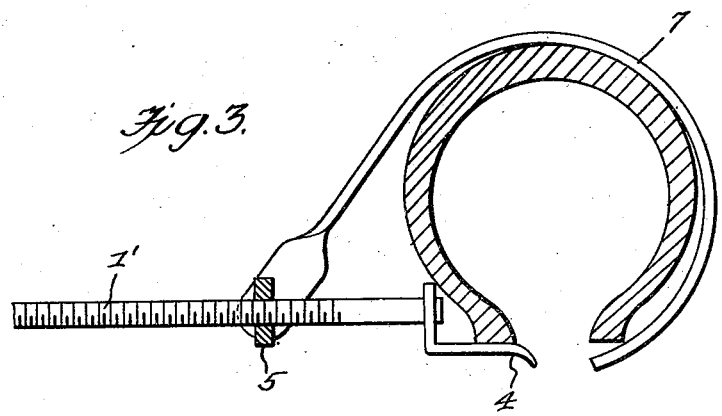
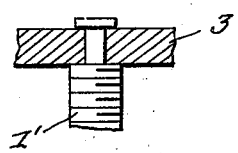
Inventor
Floyd H. Krewson,
By Clarence A. O'Brien
Attorney Patented Oct. 20, 1931

1,827,850

UNITED STATES PATENT OFFICE

FLOYD HAROLD KREWSON, OF JAKE PRAIRIE, MISSOURI

TOOL FOR REMOVING TIRES

Application filed April 21, 1931. Serial No. 531,816.

This invention relates to a tire tool, the general object of the invention being to provide means for removing a tire from a wheel, through means of a shaft having a fork member at one end thereof for engaging one side of the tire, and a cross piece on the shaft carrying two hooks, the beaks of which engage the other side of the tire, so that by rocking the shaft, after the fork member has been placed under one edge of the tire, the tire can be easily and quickly removed.

This invention also consists in certain other features of construction and in the combination and arrangement of the several parts, to be hereinafter fully described, illustrated in the accompanying drawings, and specifically pointed out in the appended claim.

In describing the invention in detail, reference will be had to the accompanying drawings wherein like characters denote like or corresponding parts throughout the several views, and in which:—

Figure 1 is a side view of a portion of a wheel showing the invention in use, the handle or shaft of the device being in section.

Fig. 2 is a top plan view of Fig. 1.

Fig. 3 is a section on the line 3—3 of Fig. 1.

Fig. 4 is a view of the forked member.

Fig. 5 is a fragmentary view of the cross bar.

Fig. 6 is a sectional detail view showing how the fork part is pivotally connected to the end of the shaft.

In these drawings, the numeral 1 indicates a shaft having a threaded part 1' thereon and a handle 2 connected to one end of the shaft, and a pronged member pivotally connected to the other end of the shaft. This prong has its bight part arranged at right angles to the prongs, and the pivotal point of the shaft passes through the center of the bight part, and the prongs are curved downwardly and beveled at their edges as shown at 4, so that these prongs can be pressed over the bead of the rim of a wheel and then forced over the edge of a tire as shown in Fig. 3.

A cross bar 5 has a threaded hole at the center, through which the threaded part of the shaft passes and a trunnion 6 is connected to each end of the cross bar for forming a pivot for a hook 7, these hooks being large enough to be swung over the tire and engage the edge thereof which is opposite the edge under which the prongs 4 pass, as shown in Fig. 3.

From the foregoing, it will be seen that the prong member can be placed under one edge of the tire and the hook 7 placed over the tire to engage the opposite edge as shown in Fig. 3, and then by properly manipulating the shaft 1, after the shaft has been rotated to cause the hook members to compress the tire, the tire can be removed from the wheel. It will be seen that when the shaft is rotated the hooks are moved toward the prong members so as to press the tire and force the same from the wheel.

It is thought from the foregoing description that the advantages and novel features of the invention will be readily apparent.

It is to be understood that changes may be made in the construction and in the combination and arrangement of the several parts, provided that such changes fall within the scope of the appended claim.

Having thus described my invention, what I claim as new is:—

A tire tool comprising a threaded shaft, an angle shaped member pivotally connected with one end of the shaft, and having prongs forming one limb thereof, the ends of the prongs being curved downwardly and slightly beveled, a handle on the opposite end of the shaft, a cross bar having a hole at its center threaded to receive the shaft, and a hook pivoted to each end of the bar and adapted to extend over the tire.

In testimony whereof I affix my signature.

FLOYD HAROLD KREWSON.